United States Patent [19]

Harris et al.

[11] Patent Number: 4,527,696
[45] Date of Patent: Jul. 9, 1985

[54] AUTOMOBILE BEVERAGE HOLDER

[76] Inventors: Jimmy G. Harris, 902 W. Paterson; Olen R. Harris, 2108 W. 3rd Ave., both of Flint, Mich. 48504

[21] Appl. No.: 517,702

[22] Filed: Jul. 27, 1983

[51] Int. Cl.³ .............................................. A47F 5/00
[52] U.S. Cl. ...................................... 211/86; 248/146
[58] Field of Search ........................... 211/86, 71, 74; 248/346, 146; 297/194; 224/42.42; D3/40

[56] References Cited

U.S. PATENT DOCUMENTS

| | | | |
|---|---|---|---|
| 2,016,097 | 10/1935 | Parsons | 211/74 X |
| 2,609,418 | 9/1952 | Binns et al. | 211/86 X |
| 3,120,308 | 2/1964 | Pierro | 211/74 |
| 3,135,392 | 6/1964 | Elkins | 211/86 |
| 4,061,971 | 12/1977 | Barron | 248/346 X |

FOREIGN PATENT DOCUMENTS 405805 9/1964 Switzerland ................... 248/146

Primary Examiner—Ramon S. Britts
Assistant Examiner—Sarah A. Lechok
Attorney, Agent, or Firm—Harry R. Dumont

[57] ABSTRACT

A holder for beverage containers that is adapted to be mounted between two front bucket seats. The holder includes a pair of spaced wells and an intermediate bracket having a channel formed through it for mounting engagement with the handle of a parking brake located between the two front bucket seats.

6 Claims, 3 Drawing Figures

AUTOMOBILE BEVERAGE HOLDER

BACKGROUND OF THE INVENTION

This invention relates to a bottle, can or cup holder designed for use in those models with bucket seats and parking brake or emergency handle positioned between the seats. A number of prior art beverage holders are known that rest upon the longitudinally extending tunnel hump of an automobile vehicle. Many devices of varying design have been provided to these holders in place on the tunnel. One type of anchoring is shown in U.S. Pat. No. 3,561,589 issued on Feb. 9, 1971 to Daniel C. Larkin, Jr. et al for "ARTICLE HOLDER FOR MOTOR VEHICLE BODY".

Beverage holder devices that are adapted to be clamped in place are shown in U.S. Pat. No. 3,136,461 issued on June 9, 1964 to D.F. Gregg, Jr. for "AUTOMOBILE SERVICE BAR".

A still further holding device for automobile trays is illustrated in U.S. Pat. No. 1,705,898 issued on Mar. 19, 1926 to K. W. Cannon et al for "SMOKERS ARTICLE".

These prior art devices generally require some effort and positioning by the automobile driver in order to place them in position and they are not as securely anchored as the beverage holder according to the present invention.

BRIEF SUMMARY OF THE INVENTION

This invention relates to an improved beverage holder in which the mounting system includes a central bracket between two beverage holding wells such that there is provided a channel with a deflectable material lining that securely engages a parking brake handle positioned between the two front seats.

BRIEF DESCRIPTION OF THE DRAWINGS

The present invention will now be described with respect to the accompanying specification and to the drawings in which like reference numerals refer to similar parts where they may occur within the several views and in which.

DETAILED DESCRIPTION OF THE PREFERRED EMBODIMENT

Figure 1:
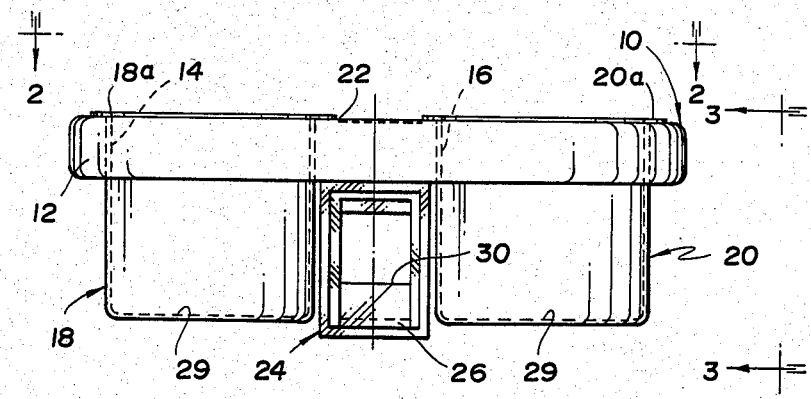
FIG. 1 is a front elevational view of the beverage holder.
Figure 2:
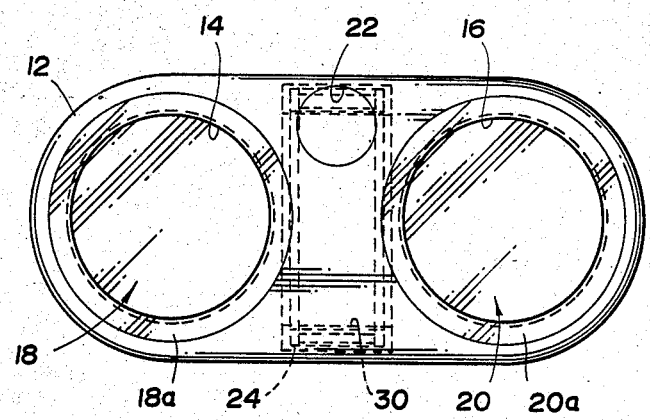
FIG. 2 is a top plan view of the holder.
Figure 3:
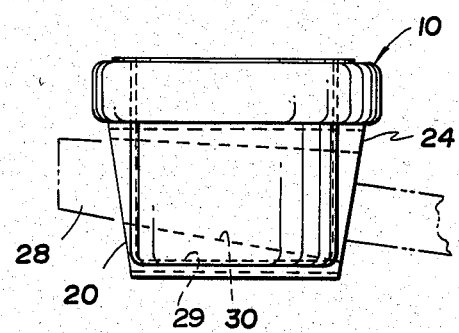
FIG. 3 is a right elevational view of the holder with parts broken away, showing the manner in which the holder is mounted on a parking brake.

FIG. 1 shows the beverage holder 10 that includes an upper receiver 12 that is designed to have a pair of spaced wells 14 and 16 for receiving and holding a like sized pair of cups 18 and 20, respectively. Each has an extended upper rim 18a and 20a respectively for holding them in place within the corresponding wells 14 and 16. The corners of the receiver 12 are preferably rounded off to avoid sharp edges and for symmetry with the cups 18 and 20. A circular recess 22 is shown intermediate the wells 14 and 16 and is adapted to hold a insignia or medallion which would normally be related to the car model with which the beverage holder is used. A central mounting bracket 24 is fixed to the lower surface of the retainer 12 intermediate the cups 18 and 20. The bracket 24 is lined with a resilient material 26 to engage in a tight holding manner with the parking brake handle 28 as it extends between the two front seats in a forward direction. The lining material 26 will be seen to form a tapered opening 30 which assists in holding beverage retainer 10 in a secure mounted position on the brake handle 28.

A cork insert 29 is fitted in the bottom of the cups 18 and 20 to absorb condensation and to dampen noise and vibrations of the beverage bottle or glass held in the cup. It will be understood that the cups 18 and 20 can alternately be fabricated of a hard foam type insulating material that likewise would dampen vibrations and further insulate the beverage.

The resulting beverage holder is one that is easily attached for use and quickly removable for storage. The resilient lining material 26 can be easily replaced should wear occur with little cost and difficulty.

It will thus be seen that we have provided by our invention an improved beverage holder with a secure and convenient mounting arrangement for use in automobiles.

We claim:

1. A beverage holder for mounting on a forwardly oriented vehicle parking brake handle located between a pair of front seats, comprising:
   a receiver having at least one opening for receiving a beverage container; and
   a mounting bracket fixed to the lower surface of said receiver, said bracket having front and rear portions and including a rearwardly extending, rectangular opening, said opening having top and bottom walls which taper from said front to said rear portion complementary in shape to said handle and having a resilient lining for engagement over such handle in tight holding relationship.

2. The combination as set forth in claim 1 including a recess formed in the upper surface of said receiver for retaining an insignia.

3. The combination as set forth in claim 1 in which said receiver includes a pair of spaced wells.

4. The combination as set forth in claim 3 in which a pair of cups with enlarged rims are retained in said wells.

5. The combination as set forth in claim 3 in which the receiver includes a pair of rounded end portions, each having one of said wells.

6. The combination set forth in claim 4 in which said cups are fabricated from a foam type insulating material.

* * * * *